US007423402B2

(12) United States Patent
Sano et al.

(10) Patent No.: US 7,423,402 B2
(45) Date of Patent: Sep. 9, 2008

(54) AUTONOMOUS TRAVELING UNIT SYSTEM

(75) Inventors: Masahito Sano, Fuji (JP); Yoshiyuki Hirahara, Mishima (JP); Masayuki Nakaeda, Kawasaki (JP); Hitoshi Iizaka, Fuji (JP); Takashi Tomiyama, Mishima (JP)

(73) Assignee: Toshiba Tec Kabushiki Kaisha (JP)

( * ) Notice: Subject to any disclaimer, the term of this patent is extended or adjusted under 35 U.S.C. 154(b) by 315 days.

(21) Appl. No.: 11/332,863

(22) Filed: Jan. 16, 2006

(65) Prior Publication Data

US 2006/0132611 A1    Jun. 22, 2006

Related U.S. Application Data

(63) Continuation of application No. PCT/JP2005/009190, filed on May 19, 2005.

(30) Foreign Application Priority Data

May 21, 2004    (JP)    ............................. 2004-151795

(51) Int. Cl.
*B64C 13/18*    (2006.01)

(52) U.S. Cl. .................. 318/587; 318/568.12; 320/109; 700/245; 180/170

(58) Field of Classification Search ................ 318/587, 318/568.11–568.12; 180/170; 700/245
See application file for complete search history.

(56) References Cited

U.S. PATENT DOCUMENTS 5,646,494 A    7/1997   Han 6,504,610 B1    1/2003   Bauer et al.
2003/0094922 A1*  5/2003  Petersson et al. ............ 320/109

(Continued)

FOREIGN PATENT DOCUMENTS

JP    5-61545    3/1993

(Continued)

OTHER PUBLICATIONS

International Search Report re: related application No. PCT/JP2005/009190.

(Continued)

*Primary Examiner*—Paul Ip
(74) *Attorney, Agent, or Firm*—Harness, Dickey & Pierce, P.L.C.

(57) ABSTRACT

An autonomous traveling unit is advanced toward a wall such that a charging unit is located on the right side. When a distance to the wall reaches a predetermined value not smaller than a thickness of a first member of the charging unit, the autonomous traveling unit is stopped. In this state, the autonomous traveling unit is rotated by 90° to the right so as to face a plane formed by a second member of the charging unit at the right angle. Then, the autonomous traveling unit is advanced toward the second member of the charging unit, and when a distance to the plane reaches a predetermined value, the autonomous traveling unit is stopped. In this state, the autonomous traveling unit is rotated by 90° to the right such that charging terminals face power supply terminals provided on the first member of the charging unit at the right angle. Finally, the autonomous traveling unit is run backward slightly, and when the charging terminals come into contact with the power supply terminals, the autonomous traveling unit is stopped and charging to the autonomous traveling unit is started.

7 Claims, 7 Drawing Sheets

U.S. PATENT DOCUMENTS

2005/0230166 A1* 10/2005 Petersson et al. ............ 180/170
2007/0021869 A1* 1/2007 Baek et al. ................. 700/245

FOREIGN PATENT DOCUMENTS

| JP | 8-83125 | 3/1996 |
|----|---------|--------|
| JP | 2002-268746 | 9/2002 |
| JP | 2003-330543 | 11/2003 |
| WO | WO 2005/114346 A1 | 5/2005 |

OTHER PUBLICATIONS

International Preliminary Report on Patentability for PCT/JP2005/009190.

* cited by examiner

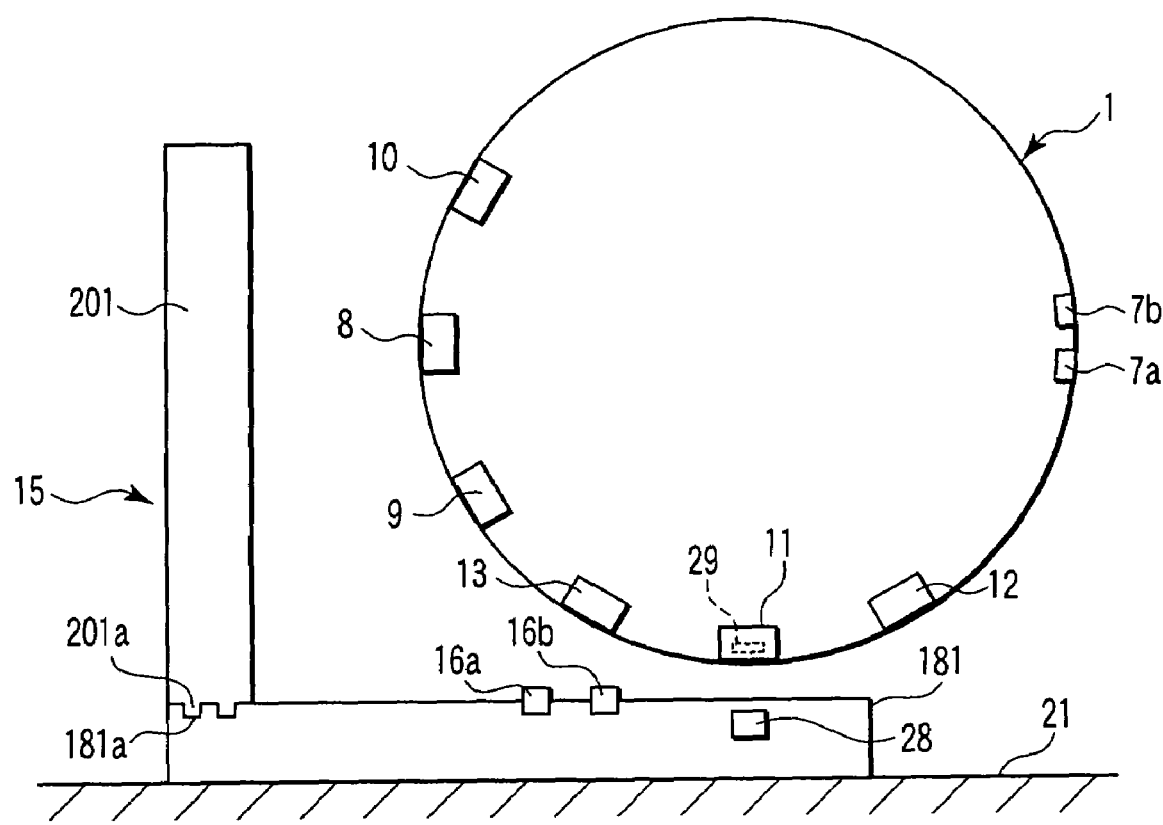
F I G. 10

AUTONOMOUS TRAVELING UNIT SYSTEM

CROSS-REFERENCE TO RELATED APPLICATIONS

This is a Continuation Application of PCT Application No. PCT/JP2005/009190, filed May 19, 2005, which was published under PCT Article 21(2) in Japanese.

This application is based upon and claims the benefit of priority from prior Japanese Patent Application No. 2004-151795, filed May 21, 2004, the entire contents of which are incorporated herein by reference.

BACKGROUND OF THE INVENTION

1. Field of the Invention

The present invention relates to an autonomous traveling unit system comprising an autonomous traveling unit which autonomously travels by receiving supply of electricity from a battery and a charging unit for charging the battery of the autonomous traveling unit.

2. Description of the Related Art

Conventionally, an autonomous traveling unit which autonomously travels by receiving supply of electricity from a battery comprises plug means which is connected to an external receptacle, camera means for taking an image of the surrounding, and image processing means for processing an image taken by the camera means. When the battery is needed to be charged, the autonomous traveling unit travels autonomously to a predetermined charging place, and by comparing image data produced by processing images taken by the camera means with predetermined comparison image data stored in advance, specifies a receptacle position at the charging place, and connects the plug to the receptacle for charging based on a result of the specification (for example, see Jpn. Pat. Appln. KOKAI Publication No. 2002-268746).

BRIEF SUMMARY OF THE INVENTION

However, an autonomous traveling unit, which comprises camera means and image processing means, has such a problem that its configuration becomes complicated and burden of cost increases.

An object of the present invention is to provide an autonomous traveling unit system that enables its configuration to be simplified and its burden of cost to be reduced.

The invention is to provide an autonomous traveling unit system comprising: an autonomous traveling unit loaded with a battery, the autonomous traveling unit traveling autonomously by receiving supply of electricity from the battery and being provided with charging terminals to charge the battery so as to be exposed outside; and a charging unit provided with power supply terminals which make contact with the charging terminals of the autonomous traveling unit, the charging unit charging the battery from the power supply terminals, wherein the charging unit has a first member which forms a plane provided with the power supply terminals and a second member which forms a plane perpendicular to the plane formed by the first member, the first member being arranged so that the plane provided with the power supply terminal is parallel to a plane located behind the first member, the autonomous traveling unit has: distance detecting means, which is composed of, for example, an ultrasonic receiver or an optical transmitter/receiver, etc., for detecting a distance up to an obstacle located in an advancement direction thereof; first advancement control means for allowing to advance toward a surface parallel to the plane formed by the first member of the charging unit until a distance to the parallel surface detected by the distance detecting means reaches a predetermined value; first rotation control means for, when the distance to the parallel surface reaches the predetermined value, rotating the autonomous traveling unit so that the distance detecting means faces a plane formed by the second member; second advancement control means for, when it faces the plane formed by the second member at the right angle, advancing the autonomous traveling unit until the distance to the plane reaches a predetermined value; second rotation control means for, when the distance to the plane formed by the second member reaches the predetermined value, rotating the autonomous traveling unit so that the charging terminals face the power supply terminals; and contact control means for, when the charging terminals face the power supply terminals, running the autonomous traveling unit so that the charging terminals come into contact with the power supply terminals, and when the charging terminals of the autonomous traveling unit come into contact with the power supply terminals, charging to the battery is started.

BRIEF DESCRIPTION OF THE SEVERAL VIEWS OF THE DRAWING

FIG. 10 is a diagram showing the relation between an autonomous traveling unit and a charging unit according to a sixth embodiment of the present invention.

DETAILED DESCRIPTION OF THE INVENTION

Hereinafter embodiments of the present invention will be described with reference to the accompanying drawings.

First Embodiment

Figure 1:
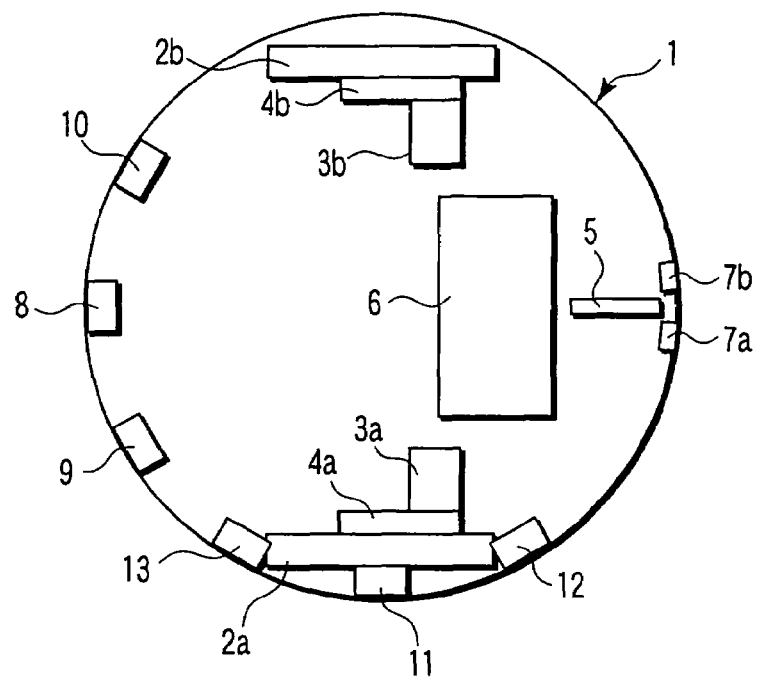
FIG. 1 is a diagram showing a configuration of major components of an autonomous traveling unit according to a first embodiment of the present invention.

As shown in FIG. 1, right and left drive wheels 2a, 2b are arranged on both sides of a central portion of an autonomous traveling unit 1 substantially circular as viewed from above, and the right and left drive wheels 2a, 2b are driven in a normal direction and in a reverse direction by means of a drive mechanism comprising right and left wheel motors 3a, 3b and right and left decelerators 4a, 4b.

A driven wheel 5 which rotates in free directions is arranged in the center of a rear portion of the autonomous traveling unit 1, and a battery 6 for supplying electricity to the wheel motors 3a, 3b and the like is loaded behind the center of the traveling unit main body 1. Charging terminals 7a, 7b for charging the battery 6 are provided on the side face at a rear end of the autonomous traveling unit 1 such that they are exposed outside.

An ultrasonic transmitter 8 is arranged in the center of the side face at a front end of the autonomous traveling unit 1, and ultrasonic receivers 9, 10 are arranged on both sides of the ultrasonic transmitter 8 with a specific distance therebetween. The ultrasonic transmitter 8 and the ultrasonic receivers 9, 10 constitute first distance detecting means, which detects a distance up to an obstacle by receiving a reflection of an ultrasonic wave sent from the ultrasonic transmitter 8 on the obstacle such as a wall located in the advancement direction by means of the ultrasonic receivers 9, 10.

An ultrasonic transmitter 11 is arranged in the center of the side face at a left end of the autonomous traveling unit 1, and ultrasonic receivers 12, 13 are arranged on both side of the ultrasonic transmitter 11 with a specific distance therebetween. The ultrasonic transmitter 11 and the ultrasonic receivers 12, 13 constitute second distance detecting means, which detects an obstacle such as a wall located in a side face direction perpendicular to the advancement direction. That is, the ultrasonic receivers 12, 13 receive a reflection of an ultrasonic wave sent by the ultrasonic transmitter 11 on an obstacle such as a wall located on the left side so as to detect a distance up to the obstacle.

Figure 2:
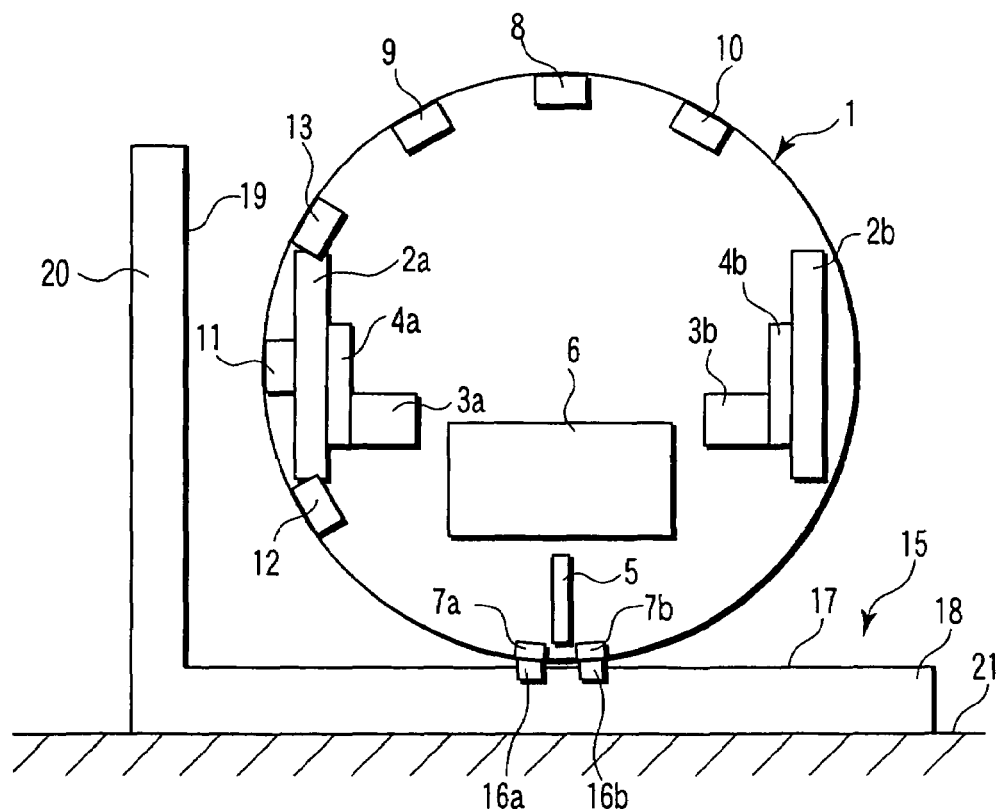
FIG. 2 is a diagram showing a charging state of the autonomous traveling unit by means of a charging unit of the embodiment.

As shown in FIG. 2, the charging unit 15 is an L-shaped body constituted of a first member 18 which forms a plane 17 provided with power supply terminals 16a, 16b and a second member 20 which forms a plane 19 perpendicular to the plane 17 formed by the first member 18, and the rear face of the first member 18 is fixed to a wall 21.

The autonomous traveling unit 1 is configured to start charging by the charging unit 15 with the charging terminals 7a, 7b located on the side face at the rear end in contact with the power supply terminals 16a, 16b.

Figure 3:
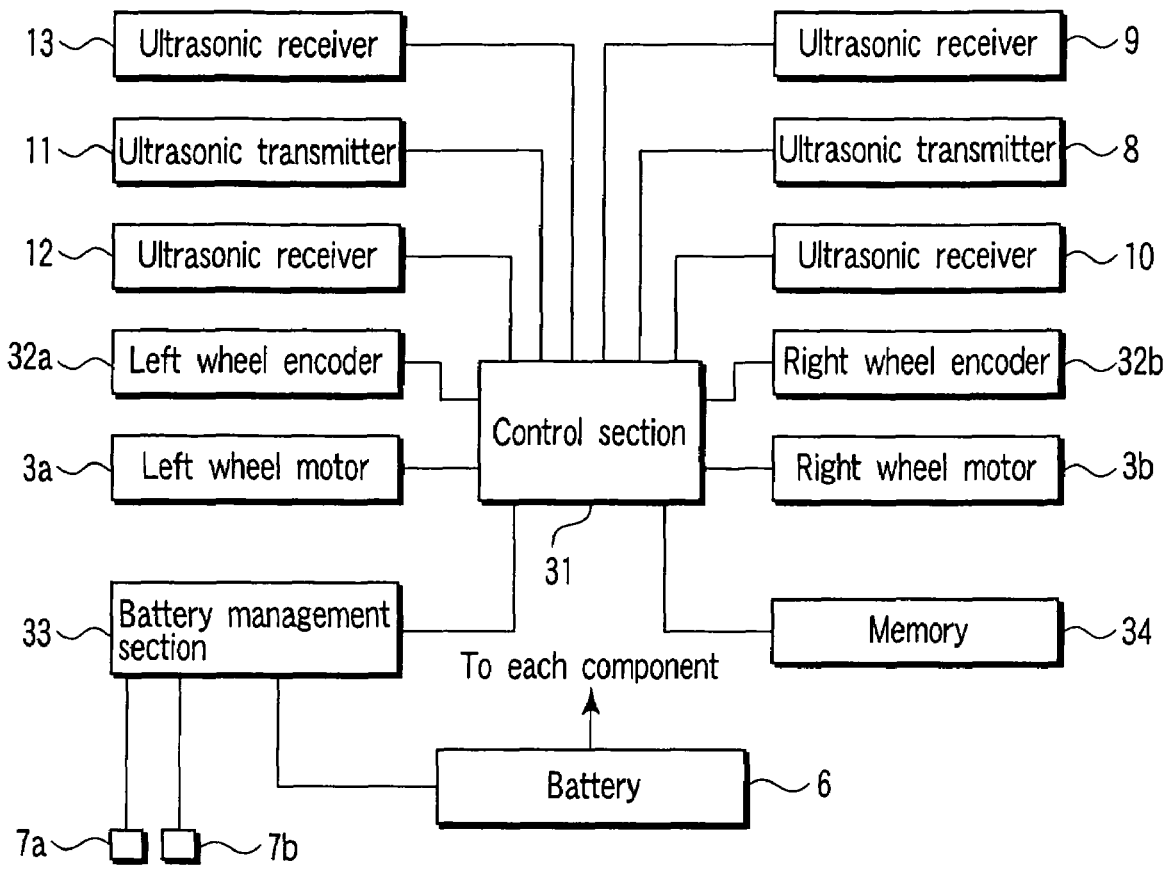
FIG. 3 is a block diagram showing a configuration of major portions of the autonomous traveling unit according to the embodiment.

FIG. 3 is a block diagram showing a configuration of major components of the autonomous traveling unit 1, which includes a control section 31 constituted of a CPU, a ROM, and an I/O port. The control section 31 controls the driving of the ultrasonic transmitters 8, 11 and the ultrasonic receivers 9, 10, 12, 13 and controls the driving of the right, left wheel motors 3a, 3b.

Right and left wheel encoders 32a, 32b for detecting the revolution speeds of the right and left drive wheels 2a, 2b are provided, and the wheel encoders 32a, 32b are controlled by the control section 31. A battery management section 33 for managing voltage drop and charging of the battery 6 is provided, and the battery management section 33 is controlled by the control section 31. Further, a memory 34 is provided, which stores map information and the like for autonomous traveling of the autonomous traveling unit 1.

Figure 4:
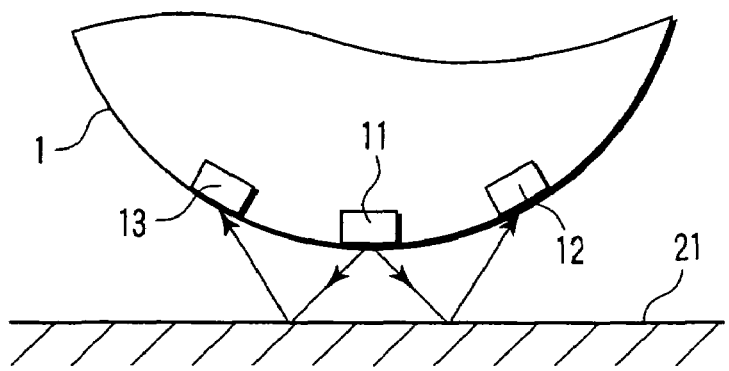
FIG. 4 is a diagram for explaining attitude control by second distance detecting means of the autonomous traveling unit according to the embodiment.

In the ultrasonic transmitter 11 and the ultrasonic receivers 12, 13 constituting the second distance detecting means, as shown in FIG. 4, the ultrasonic receivers 12, 13 receive a reflection of an ultrasonic wave sent by the ultrasonic transmitter 11 on the wall 21 so as to acquire two items of distance data. Then, by adjusting the direction of the autonomous traveling unit 1 so as to equalize the two items of distance data, the attitude of the autonomous traveling unit 1 is controlled so that the autonomous traveling unit 1 is parallel to the wall 21.

Next, an operation until the autonomous traveling unit 1 travels autonomously and starts charging with the charging unit 15 will be described.

Figure 5A:
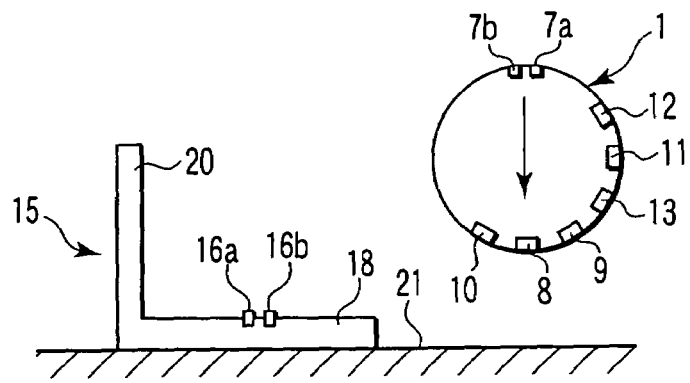
FIG. 5A is a diagram for explaining positioning control to the charging unit of the autonomous traveling unit according to the embodiment.

The control section 31 drives the right and left wheel motors 3a, 3b, and as indicated with an arrow in FIG. 5A, advances the autonomous traveling unit 1 toward the wall 21 parallel to the plane 17 formed by the first member 18 of the charging unit 15 in a state in which the autonomous traveling unit 1 is located on the right side of the charging unit 15. Then, a distance relative to the wall 21 is measured by the ultrasonic transmitter 8 and the ultrasonic receivers 9, 10, and when the distance from the wall 21 reaches a predetermined distance not smaller than the thickness of the first member 18 of the charging unit 15, the autonomous traveling unit 1 is stopped (first advancement control means).

In this state, the control section 31 drives the right and left wheel motors 3a, 3b, and as indicated with an arrow in FIG. 5A, rotates the autonomous traveling unit 1 by 90° (first rotation control means) so that it faces the plane 19 formed by the second member 20 at the right angle. At this time, the ultrasonic transmitter 11 and the ultrasonic receivers 12, 13 execute attitude control so that the autonomous traveling unit 1 turns parallel to the wall 21.

In this state, the control section 31 drives the right and left wheel motors 3a, 3b, and advances the autonomous traveling unit 1 toward the second member 20 of the charging unit 15. Then, a distance to the plane 19 formed by the second member 20 of the charging unit 15 is measured by the ultrasonic transmitter 8 and the ultrasonic receivers 9, 10, and when the distance to the plane 19 reaches a predetermined value, the autonomous traveling unit 1 is stopped, as indicated in FIG. 5C (second advancement control means).

Figure 5B:
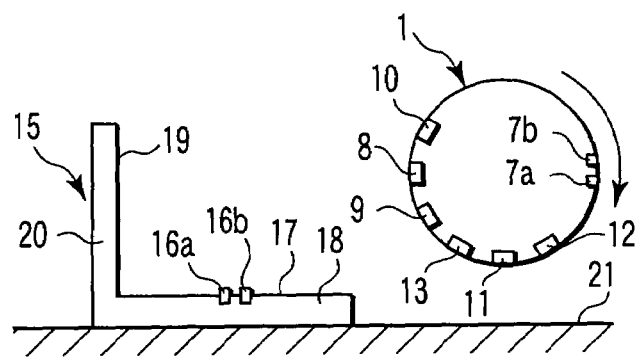
FIG. 5B is a diagram for explaining positioning control to the charging unit of the autonomous traveling unit according to the embodiment.
Figure 5C:
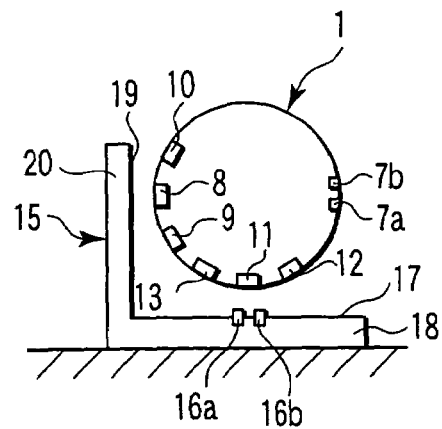
FIG. 5C is a diagram for explaining positioning control to the charging unit of the autonomous traveling unit according to the embodiment.
Figure 5D:
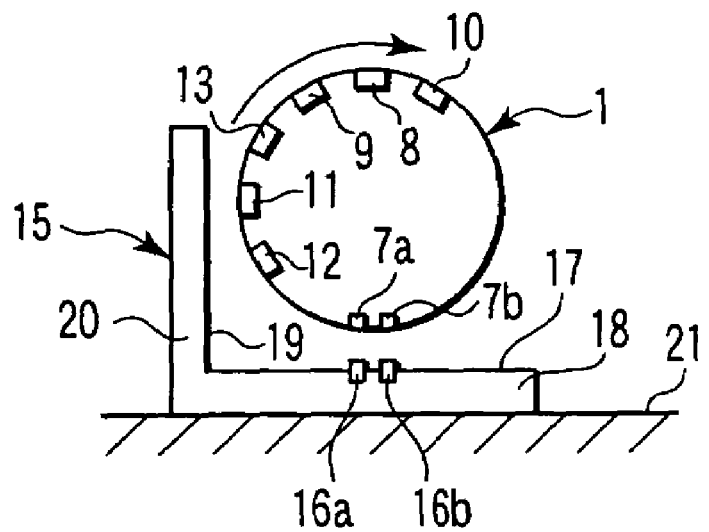
FIG. 5D is a diagram for explaining positioning control to the charging unit of the autonomous traveling unit according to the embodiment.

In this state, the control section 31 drives the right and left wheel motors 3a, 3b, and as indicated with an arrow in FIG. 5D, the autonomous traveling unit 1 is rotated by 90° so that the charging terminals 7a, 7b face the power supply terminals 16a, 16b provided on the first member 18 of the charging unit 15 at the right angle (second rotation control means). At this time, the ultrasonic transmitter 11 and the ultrasonic receivers 12, 13 execute attitude control so that the autonomous traveling unit 1 turns parallel to the plane 19 formed by the second member 20.

Figure 5E:
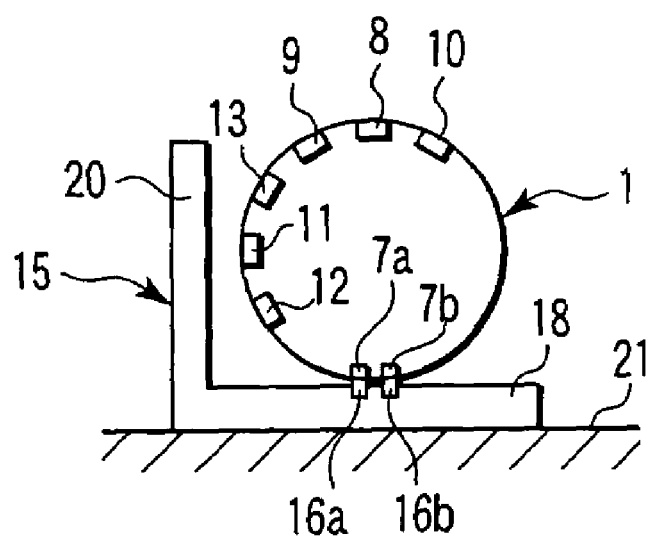
FIG. 5E is a diagram for explaining positioning control to the charging unit of the autonomous traveling unit according to the embodiment.

Finally, as shown in FIG. 5E, the control section 31 drives the right and left wheel motors 3a, 3b so as to move the autonomous traveling unit 1 slightly backward, and with the charging terminals 7a, 7b in contact with the power supply terminals 16a, 16b, the traveling unit is stopped (contact control means). This contact detection is executed in such a manner that the battery management section 33 detects that a predetermined voltage is generated between the charging terminals 7a and 7b.

When the charging terminals 7a, 7b of the autonomous traveling unit 1 make contact with the power supply terminals 16a, 16b, charging to the battery 6 is started.

In this way, the charging unit 15 is constituted of the first member 18 which forms the plane 17 provided with the power supply terminals 16a, 16b and the second member 20 which forms the plane 19 perpendicular to the plane 17 formed by the first member 18. Then, the autonomous traveling unit 1 controls so as to bring the charging terminals 7a, 7b into contact with the power supply terminals 16a, 16b by executing positioning control with respect to the wall 21 parallel to the plane 17 formed by the first member 18 of the charging unit 15 and positioning control with respect to the plane 19 of the second member 20 of the charging unit 15 by using the ultrasonic transmitter 8 and the ultrasonic receivers 9, 10, which are the first distance detecting means for detecting an obstacle such as a wall located in the advancement direction.

Therefore, the autonomous traveling unit 1 can achieve positioning with respect to the charging unit 15 without using a camera, image processing means or the like. That is, the configuration can be simplified and burden of cost can be reduced.

The autonomous traveling unit 1 executes attitude control so that the autonomous traveling unit 1 is in parallel to the plane 19 formed by the second member 20 by using the ultrasonic transmitter 11 and the ultrasonic receivers 12, 13, which are second distance detecting means for detecting an obstacle such as a wall in the side face direction perpendicular to the advancement direction, and therefore, securer positioning control can be carried out.

In the above embodiment, an example that an ultrasonic sensor constituted of the ultrasonic transmitter and ultrasonic receivers is used as first and second distance detecting means has been mentioned. However, the present invention is not restricted to this example, but it is permissible to use an optical sensor constituted of a light projector and light receiver.

Further, in the above embodiment, an example that the charging terminals 7a, 7b are provided on the side face at the rear end of the autonomous traveling unit has been described. However, the present invention is not restricted to this example, but they may be provided on the side face at the front end.

Second Embodiment

In this embodiment, a modification of the charging unit 15 will be described.

Figure 6:
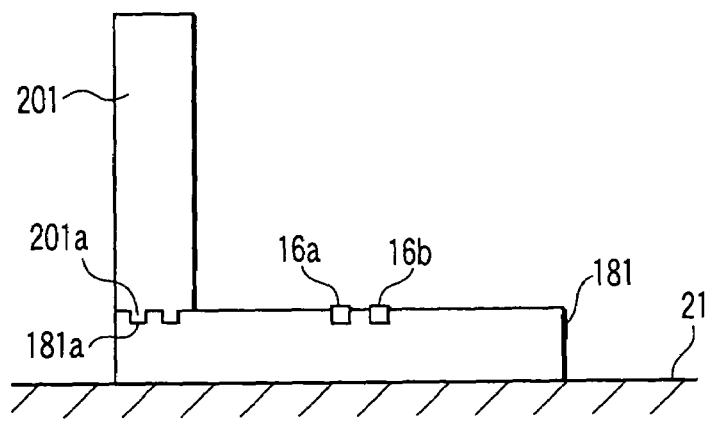
FIG. 6 is a diagram showing a configuration of a charging unit according to a second embodiment of the present invention.

As shown in FIG. 6, a second member 201 is provided attachably to/detachably from a first member 181 mounted on the wall 21. That is, fitting concave portions 181a are formed in the first member 181, and fitting convex portions 201a are formed on the end face of the second member 201. Both the members are coupled by engaging the fitting convex portions 201a with the fitting concave portions 181a.

There is a fear that a person may be tripped because the second member 201 projects from the wall 21. However, because the second member 201 is releasable easily from the first member 181 in such a case, the charging unit 15 is protected from a damage and no person is tripped.

Third Embodiment

In this embodiment, a modification of the charging unit 15 will be described.

Figure 7:
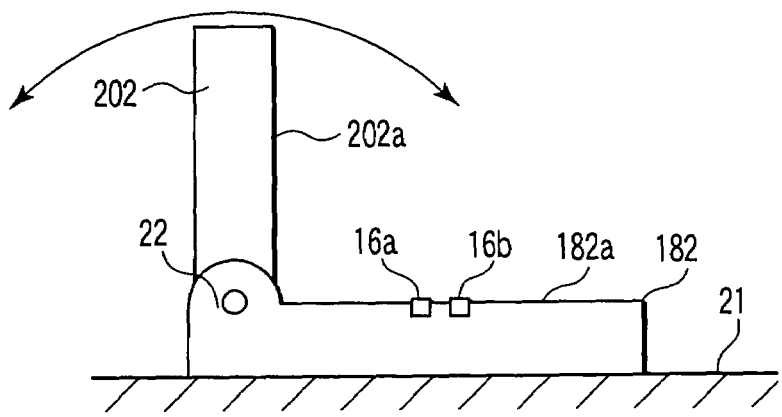
FIG. 7 is a diagram showing a configuration of a charging unit according to a third embodiment of the present invention.

As shown in FIG. 7, a second member 202 is rotatable to the right and left as indicated with an arrow in the same figure with respect to a first member 182 mounted on the wall 21 by means of a rotation mechanism 22. That is, the second member 202 is configured so that usually, a plane 202a of the second member 202 is perpendicular to a plane 182a of the first member 182 by a spring member provided in the rotation mechanism 22. When receiving an external force from the right or left direction, the second member turns to an opposite side.

Thus, even if a person is tripped by the second member 202, the charging unit 15 is protected from a damage because the second member 202 turns and falls down, and that person is also protected from falling down.

Fourth Embodiment

In this embodiment, a modification of the charging unit 15 will be described.

Figure 8:
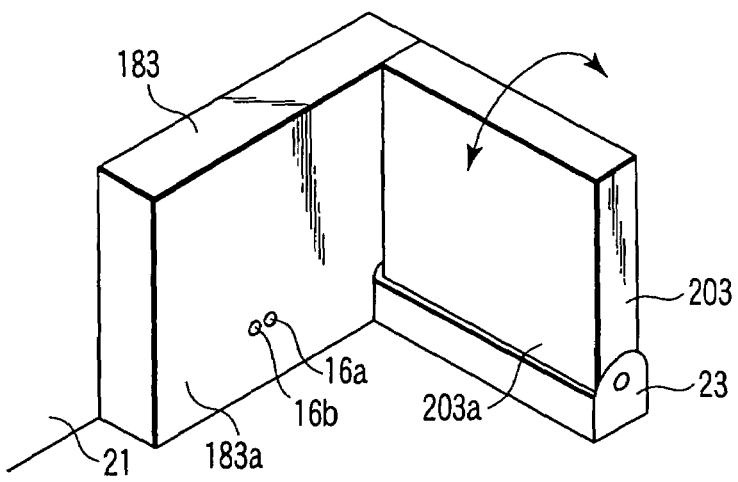
FIG. 8 is a diagram showing a configuration of a charging unit according to a fourth embodiment of the present invention.

As shown in FIG. 8, a second member 203 is rotatable to the floor as indicated with an arrow in the same figure with respect to a first member 183 mounted on the wall 21 by means of a rotation mechanism 203. That is, the second member 203 is configured so that a plane 203a of the second member 203 is perpendicular to a plane 183a of the first member 183 by a spring member provided within the rotation mechanism 23. The second member rotates to the floor surface if it receives an external force from any one of the right and left directions.

Thus, even if a person is tripped by the second member 203, the second member 203 rotates and falls down, and consequently, the charging unit 15 is protected from a damage and that person is protected from falling down.

Fifth Embodiment

In this embodiment, a modification of the charging unit 15 will be described.

Figure 9A:
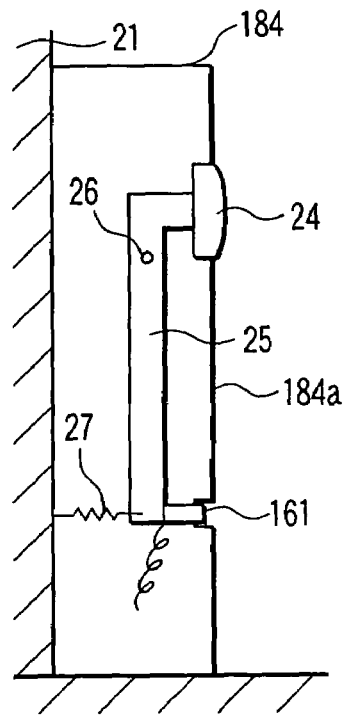
FIG. 9A is a diagram showing a configuration of part of a charging unit according to a fifth embodiment of the present invention.
Figure 9B:
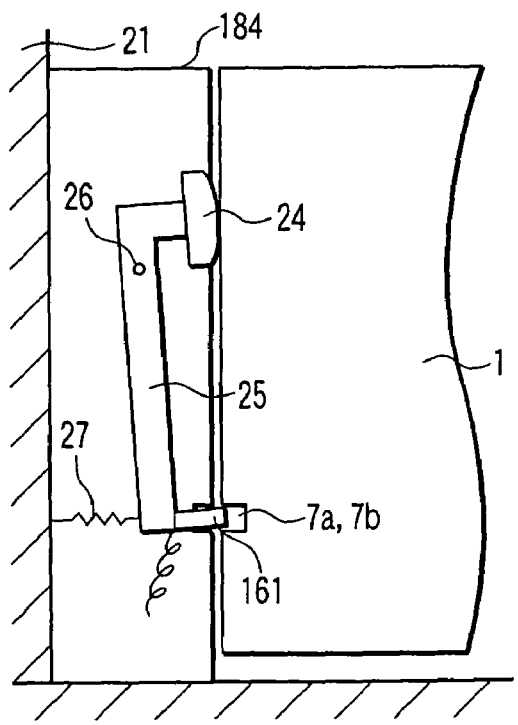
FIG. 9B is a diagram showing the configuration of part of the charging unit according to the fifth embodiment of the invention.

As shown in FIGS. 9A and 9B, a power supply terminal 161 is provided so as to be freely brought into/out of a plane 184a formed by a first member 184 mounted on the wall 21, and a projecting body 24 is provided above the power supply terminal 161 so as to be brought in/out freely.

The power supply terminal 161 and the projecting body 24 are connected by an L-shaped connecting body 25. The connecting body 25 is supported rotatably by a supporting point 26. Usually, the power supply terminal 161 is retreated from the surface 184a while the projecting body 24 is projected from the surface 184a by pulling the side of the power supply terminal by means of a coil spring 27.

When the autonomous traveling unit 1 moves from a position in FIG. 5D to a position in FIG. 5E, the rear end of the autonomous traveling unit 1 presses the projecting body 24. As a consequence, the connecting body 25 rotates in a counterclockwise direction resisting a force of the spring 27, so that the power supply terminal 161 projects from the surface 184a and comes into contact with the charging terminals 7a, 7b of the autonomous traveling unit 1.

Because the power supply terminal 161 is usually kept retreated from the surface 184a, the power supply terminal 161 is protected from being stained with dust. Because the power supply terminal 161 is supplied with elasticity by the coil spring 27, its position error can be absorbed even if the charging terminals 7a, 7b of the autonomous traveling unit 1 come into contact therewith slightly in an oblique state.

In the meantime, the connecting body 25 may be a non-elastic body or elastic body. In the embodiment, the projecting body 24 is arranged above the power supply terminal 161 while the connecting body 25 is arranged in the vertical direction. However, the same operation can be achieved by disposing the projecting body in a crosswise direction of the power supply terminal 161 and the connecting body 25 is arranged in the horizontal direction.

Sixth Embodiment

In this embodiment, a modification of an entire configuration of the present invention will be described.

As shown in FIG. 10, an electromagnet 28 is buried as a detecting object member outside the power supply terminals 16*a*, 16*b* provided on the first member 181 of the charging unit 15. Further, a magnetic sensor 29 such as a hole device is mounted as a detector which is located below the ultrasonic transmitter 11 in the autonomous traveling unit 1 and constitutes a pair with the detecting object member.

When the autonomous traveling unit 1 moves from FIG. 5B to FIG. 5C, the configuration enables to determine that the autonomous traveling unit 1 reaches the charging unit 15 due to the magnetic sensor 29 sensing the electromagnet 28.

If a type in which the second member 201 is attachable to/detachable from the first member 181 is used as the charging unit 15, the autonomous traveling unit 1 may reach the charging unit 15 with the second member 201 detached from the first member 181. In such a case, the magnetic sensor 29 detects the electromagnet 28 so as to determine that the autonomous traveling unit reaches the charging unit 15, and thereafter, the autonomous traveling unit 1 measures the position of the plane of the second member 201 by the ultrasonic transmitter 8 and the ultrasonic receivers 9, 10. At this time, if the second member 201 is present, the measured distance is within a predetermined distance, but if the second member 201 is absent, the measured distance is not within the predetermined distance. In this case, the autonomous traveling unit 1 stops its operation. In this case, the autonomous traveling unit may be provided with notifying means to notify thereof.

The charging unit 15 can be detected securely by using the magnetic sensor 29 and the electromagnet 28. Further, the charging unit 15 can be detected more securely because the electromagnet 28 can be distinguished from magnetism from a speaker or the like existing in indoor environment if it is modulated according to a specified excitation. Moreover, if excitation of the electromagnet 28 is stopped during charging, power saving can be achieved.

According to this embodiment, the operation of the autonomous traveling unit 1 is stopped when the second member 201 is detached. However, it is permissible to control the autonomous traveling unit 1 so that the charging terminals 7*a*, 7*b* come into contact with the power supply terminals 16*a*, 16*b* with reference to a position in which the magnetic sensor 29 detects the electromagnet 28 without stopping the autonomous traveling unit 1.

A permanent magnet may be used instead of the electromagnet. Although here the detector and detecting object are described as the magnetic sensor and magnet, the present invention is not restricted to this example, but the detector and detecting object may be a light receiving device and light emitting device.

Meanwhile, according to the above respective embodiments, the shape of the autonomous traveling unit as viewed from above is substantially circular. However, the present invention is not restricted to this example, but it may be polygon.

The present invention provides an autonomous traveling unit whose configuration can be simplified and whose cost can be reduced.

What is claimed is:

1. An autonomous traveling unit system comprising:
   an autonomous traveling unit loaded with a battery, the autonomous traveling unit traveling autonomously by receiving supply of electricity from the battery and being provided with charging terminals to charge the battery so as to be exposed outside; and
   a charging unit provided with power supply terminals which make contact with the charging terminals of the autonomous traveling unit, the charging unit charging the battery from the power supply terminals, wherein
   the charging unit has a first member which forms a plane provided with the power supply terminals and a second member which forms a plane perpendicular to the plane formed by the first member, the first member being arranged so that the plane provided with the power supply terminal is parallel to a plane located behind the first member,
   the autonomous traveling unit has:
   distance detecting means for detecting a distance up to an obstacle located in an advancement direction thereof;
   first advancement control means for allowing to advance toward a surface parallel to the plane formed by the first member of the charging unit until a distance to the parallel surface detected by the distance detecting means reaches a predetermined value;
   first rotation control means for, when the distance to the parallel surface reaches the predetermined value, rotating the autonomous traveling unit so that the distance detecting means faces a plane formed by the second member;
   second advancement control means for, when it faces the plane formed by the second member at the right angle, advancing the autonomous traveling unit until the distance to the plane reaches a predetermined value;
   second rotation control means for, when the distance to the plane formed by the second member reaches the predetermined value, rotating the autonomous traveling unit so that the charging terminals face the power supply terminals; and
   contact control means for, when the charging terminals face the power supply terminals, running the autonomous traveling unit so that the charging terminals come into contact with the power supply terminals, and
   when the charging terminals of the autonomous traveling unit come into contact with the power supply terminals, charging to the battery is started.

2. The autonomous traveling unit system according to claim 1, wherein the autonomous traveling unit has second distance detecting means for detecting a distance up to an obstacle existing in a side face direction perpendicular to the advancement direction, and
   the second rotation control means positions the autonomous traveling unit to be parallel to the plane formed by the first member by using the second distance detecting means after it is rotated so that the charging terminals face the power supply terminals.

3. The autonomous traveling unit system according to claim 1 or 2, wherein the charging unit is configured so that the first member is fixed while the second member is detachable from the first member.

4. The autonomous traveling unit system according to claim 1 or 2, wherein the charging unit is configured so that the first member is fixed while the second member is rotatable by an external force and returned to its original position after the external force is released.

5. The autonomous traveling unit system according to claim 1, wherein the charging unit is configured so that a power supply terminal is provided so as to be freely brought into/out of the plane formed by the first member and a projecting body connected to the power supply terminal by a connecting body is provided so as to be freely brought into/out; that by pressing the projecting body, the power supply terminal is projected from the plane; and that, when the pressing is released, the projecting body is projected from the plane while the power supply terminal is retreated into the plane.

6. The autonomous traveling unit system according to claim 3, wherein the first member of the charging unit is provided with any one of a pair of a detector and a detecting object member while the autonomous traveling unit is provided with the other one; the detector detects the detecting object member; and unless the distance detected by the distance detecting means is within a predetermined distance when the first rotation control means rotates the autonomous traveling unit so that the distance detecting means faces the plane formed by the second member, the operation of the autonomous traveling unit is stopped.

7. The autonomous traveling unit system according to claim 6, wherein the first member of the charging unit is provided with an electromagnet as a detecting object member while the autonomous traveling unit is provided with a magnetic sensor which detects the electromagnet as a detector, whereby the electromagnet is modulated according to a specific excitation pattern.

* * * * *